(12) United States Patent
Nishide (10) Patent No.: US 11,498,524 B2
(45) Date of Patent: Nov. 15, 2022

(54) IMAGING DEVICE, METHOD OF CONTROLLING IMAGING DEVICE, AND STORAGE MEDIUM FOR REDUCING ADVERSE EFFECTS FROM DRIVING WIPER

(71) Applicant: CANON KABUSHIKI KAISHA, Tokyo (JP)

(72) Inventor: Akihiko Nishide, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 17/002,039

(22) Filed: Aug. 25, 2020

(65) Prior Publication Data

US 2021/0061229 A1 Mar. 4, 2021

(30) Foreign Application Priority Data

Aug. 28, 2019 (JP) .............................. JP2019-155496

(51) Int. Cl.
  *B60S 1/08* (2006.01)
  *B60S 1/56* (2006.01)
  *B60S 1/04* (2006.01)

(52) U.S. Cl.
  CPC .......... *B60S 1/0848* (2013.01); *B60S 1/0413* (2013.01); *B60S 1/56* (2013.01); *B60S 1/566* (2013.01)

(58) Field of Classification Search
  None
  See application file for complete search history.

(56) References Cited

U.S. PATENT DOCUMENTS

| 9,937,876 B2* | 4/2018 | Bingle ................ H04N 5/2253 |
| 10,589,726 B1* | 3/2020 | Ingram ..................... B60S 1/28 |
| 2005/0134483 A1* | 6/2005 | Monji .................. B60Q 1/1423 340/933 |
| 2015/0145956 A1* | 5/2015 | Hayakawa ................ B60S 1/56 348/148 |
| 2017/0313288 A1* | 11/2017 | Tippy ..................... B60R 1/0602 |
| 2020/0142187 A1* | 5/2020 | Hu ........................ G02B 27/0006 |

FOREIGN PATENT DOCUMENTS

| CN | 102621600 A | * | 8/2012 | |
| CN | 103838064 A | * | 6/2014 | |
| CN | 105564379 A | * | 5/2016 | ............ B60S 1/0818 |
| CN | 106427915 A | * | 2/2017 | |
| GB | 2578649 A | * | 5/2020 | ............ B08B 1/006 |
| JP | 2000123151 A | * | 4/2000 | |
| JP | 2005206032 A | * | 8/2005 | |
| JP | 5404250 B2 | | 1/2014 | |
| JP | 2015-150934 A | | 8/2015 | |

* cited by examiner

Primary Examiner — Mohammed Jebari
(74) Attorney, Agent, or Firm — Carter, DeLuca & Farrell LLP (57) ABSTRACT

In order to reduce a driving frequency of a wiper configured to wipe a surface of an optical member on a front surface of a photographing lens, an imaging device includes:
a lens; an optical member provided on a front surface side of the lens; a wiper configured to wipe a surface of the optical member, and at least one processor or circuit which functions as a detection unit configured to detect at least one of a focal length of the lens, an aperture value, and a subject size; and a control unit configured to drive the wiper so that a driving frequency of the wiper is reduced as the focal length becomes longer, the aperture value becomes smaller, or the subject size becomes larger.

10 Claims, 10 Drawing Sheets

IMAGING DEVICE, METHOD OF CONTROLLING IMAGING DEVICE, AND STORAGE MEDIUM FOR REDUCING ADVERSE EFFECTS FROM DRIVING WIPER

FIELD OF THE INVENTION

The present invention relates to an imaging device and the like having a wiper and the like.

BACKGROUND OF THE INVENTION

In recent years, there has been an increasing need for imaging devices to be installed outdoors so that persons, cars, or the like passing along a road can be continually photographed. If imaging devices are installed outdoors, dust or water drops due to rainfall may adhere to the imaging device. If dust or water drops adhere to an optical surface of a photographing lens of an imaging device, a photographed image is highly likely to be affected by the dust or water drops.

In the related art, imaging devices including a wiper mechanism configured to remove water drops and dust adhering to an optical surface of a front surface of an imaging device are known. Among such imaging devices including a wiper mechanism, an example in which an operation of a wiper and the control of an imaging device are linked is also known. For example, in Japanese Patent No. 5404250, it is possible to acquire an image in which inconvenience is not caused even when a wiper is operating.

The above prior art includes an adjustment function of reducing a change in brightness of a photographed image and in which switching concerning whether to stop the adjustment function is performed if the brightness changes in accordance with a zoom position of a zoom lens due to the passing of a wiper during the operation of the wiper happens. Furthermore, in Japanese Patent Laid-Open No. 2015-150934, in order to detect the adhesion of water drops to a windshield, photographing is performed by a camera through the windshield and detection and determination are performed on the basis of in-focus distance information. In addition, driving of a wiper is started if it is determined, based on the in-focus distance information, that water drops are adhering to the windshield is described.

Although an adjustment function of reducing a change in brightness of a photographed image at the time of passing of a wiper is controlled in accordance with a zoom magnification in the related art disclosed in Japanese Patent No. 5404250 described above, there is a problem that the wiper always operates at the same frequency and it may be difficult to observe an image depending on a subject.

Also, although the driving of a wiper is started by detecting the adhesion of water drops to an optical surface in the related art disclosed in Japanese Patent Laid-Open No. 2015-150934, determination is performed by focusing on the optical surface for detection. Thus, there is a problem that a subject cannot be photographed during that time.

If a wiper frequently operates, there is a problem that a photographed image or the durability of a wiper drive mechanism is affected by the operation of the wiper. Thus, it is desirable to reduce the number of wiper operations.

Therefore, an object of the present invention is to provide an imaging device capable of reducing adverse effects on a photographed image caused by the unnecessary driving of a wiper.

SUMMARY OF THE INVENTION

In order to achieve the above object, an imaging device according to one aspect of the present invention includes: a lens; an optical member provided on a front surface side of the lens; a wiper configured to wipe a surface of the optical member, and at least one processor or circuit which functions as a detection unit configured to detect at least one of a focal length of the lens, an aperture value, and a subject size; and a control unit configured to drive the wiper so that a driving frequency of the wiper is reduced as the focal length becomes longer, the aperture value becomes smaller, or the subject size becomes larger.

Further features of the present invention will become apparent from the following description of exemplary embodiments with reference to the attached drawings.

DESCRIPTION OF THE EMBODIMENTS

Preferred embodiments of the present invention will be described below using embodiments with reference to the accompanying drawings. In each of the drawings, the same members or constituent elements will be denoted by the same reference numerals and an overlapping description will be omitted or simplified.

Also, in the embodiments, an example in which the present invention is applied to a network camera as an imaging device will be described. However, the imaging device includes an electronic device and the like having an imaging function such as a digital still camera, a digital movie camera, and an in-vehicle camera.

First Embodiment

Figure 1A:
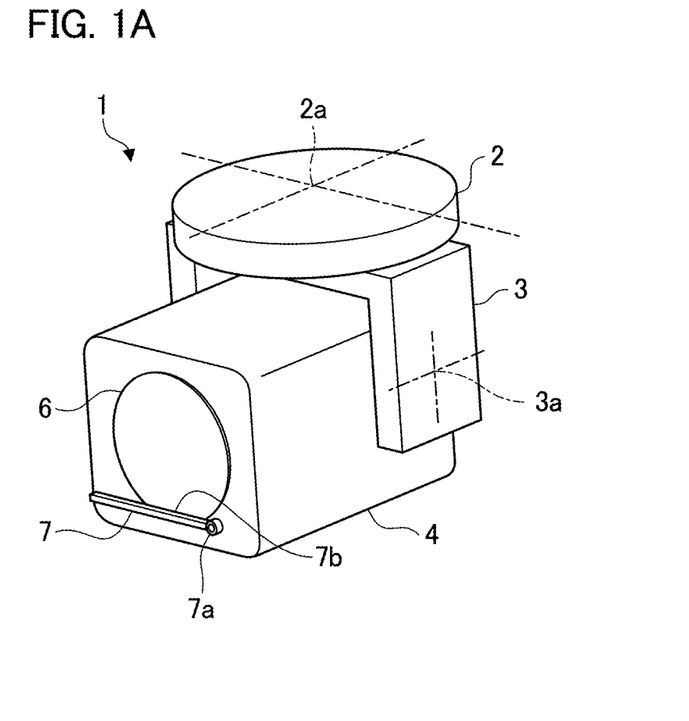
FIGS. 1A and 1B are perspective views of an imaging device in a first embodiment of the present invention.
Figure 1B:
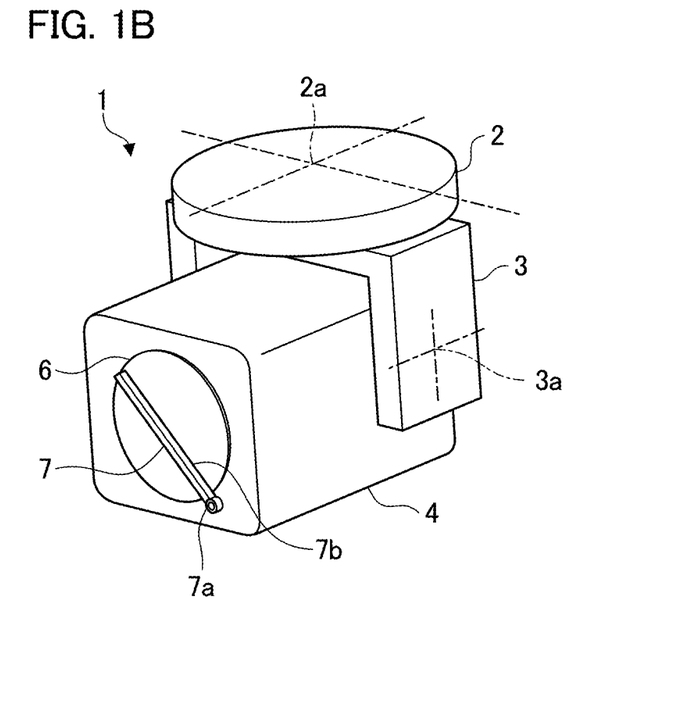
Figure 2:
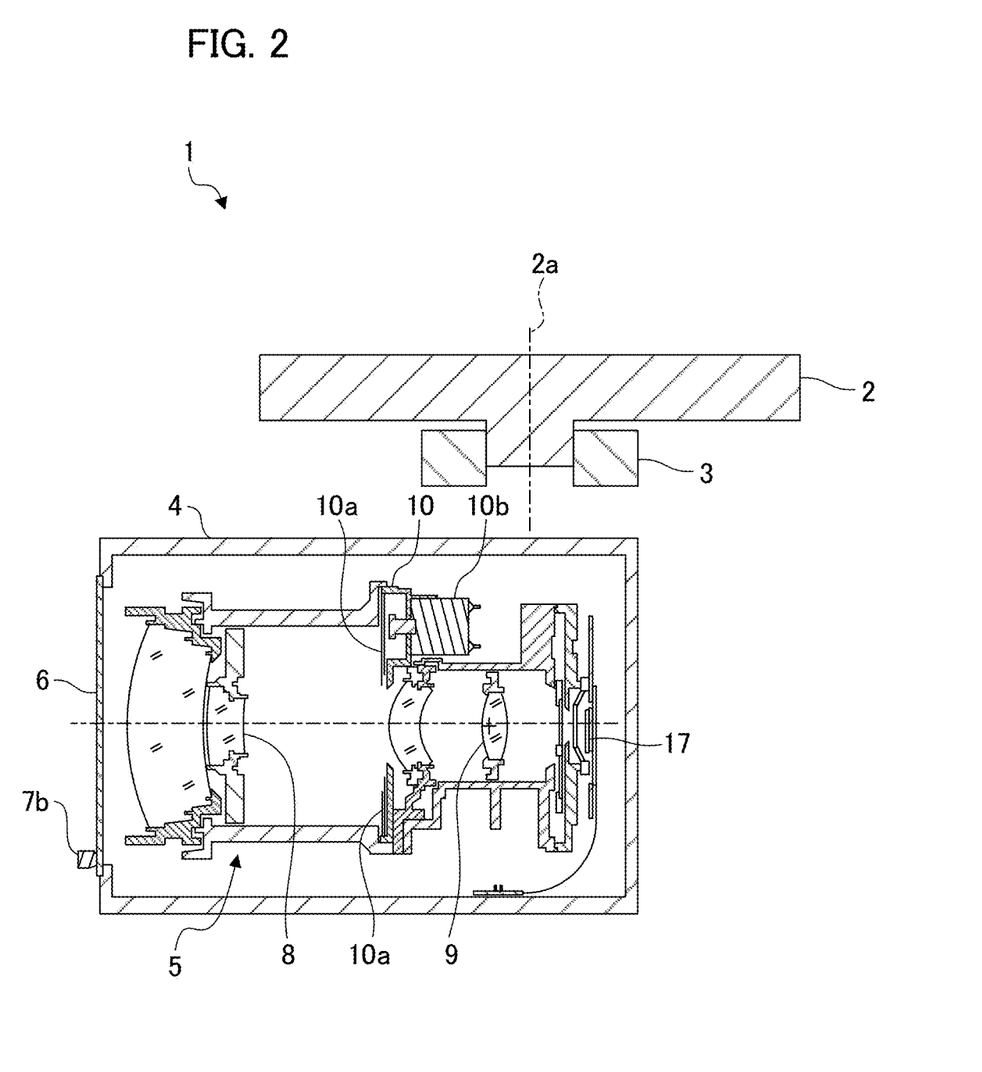
FIG. 2 is a cross-sectional view of imaging device in the first embodiment of the present invention.

FIG. 1A to FIG. 2 are perspective views and a cross-sectional view illustrating an imaging device according to a first embodiment of the present invention.

FIGS. 1A and 1B illustrate states in which wiper positions are different during the driving of a wiper, FIG. 1A illustrates a state in which the wiper is not passing over a front surface of a photographing lens, and FIG. 1B illustrates a state in which the wiper is passing over the front surface of the photographing lens.

In FIG. 1A to FIG. 2, the imaging device is denoted by reference numeral 1 and is constituted of a pan base section 2, a tilt base section 3, a camera section 4, and the like. The imaging device 1 is installed by fixing the pan base section 2 to a ceiling, under eaves, or the like. Furthermore, the pan base section 2 holds the tilt base section 3 rotatably around a pan axis 2a and drives the tilt base section 3 manually or electrically. The tilt base section 3 holds the camera section 4 rotatably around a tilt axis 3a and drives the camera section 4 manually or electrically. The camera section 4 includes the photographing lens 5 therein and a transparent cover plate 6 as an optical member configured to protect the photographing lens 5 is provided on the front surface of the photographing lens 5.

A wiper 7 wipes off water drops and dust adhering to a front surface of the cover plate 6 using a blade section 7b which rotates about a wiper axis 7a.

The photographing lens 5 is a zoom lens, includes a zoom lens group 8 and a focus lens group 9 therein, and is driven in an optical axis direction using electrical driving through the driving of a zoom motor and a focus motor which will be described later to perform zooming and focusing.

Also, lens positions of the zoom lens group 8 and the focus lens group 9 are detected using a zoom sensor and a focus sensor which will be described later. Each of the zoom lens group 8 and the focus lens group 9 is driven on the basis of the detection information such that zooming and focusing thereof are able to be controlled.

The photographing lens 5 includes a diaphragm unit 10.

The diaphragm unit 10 includes diaphragm blades 10a which form an opening therein and changes an aperture value by rotating the diaphragm blades in a direction perpendicular to an optical axis through the driving of a diaphragm motor 10b to change an opening area.

An imaging device 17 is for receiving the light of an image of a subject through the photographing lens 5 and converting the light into an electrical signal and is constituted of, for example, a CCD image sensor, a CMOS image sensor, or the like.

If the wiper 7 operates, the blade section 7b passes over the front surface of the photographing lens 5. Thus, a photographed image is affected by the blade section 7b.

Figure 3A:
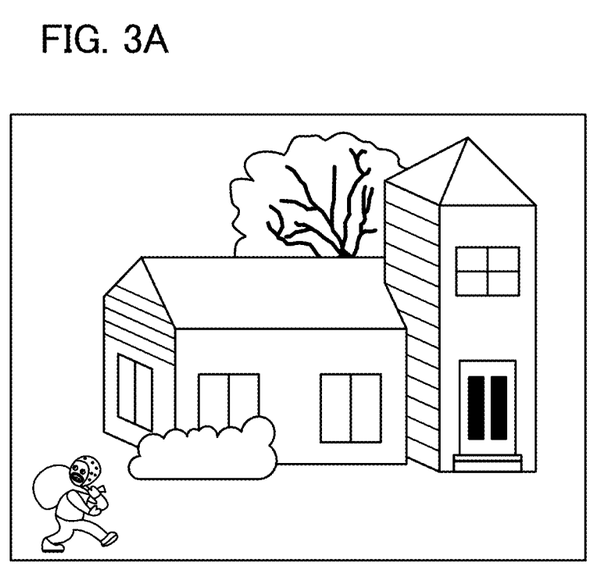
FIGS. 3A and 3B are diagrams for explaining an example of the influence of a wiper if a zoom magnification is small in the first embodiment of the present invention.
Figure 3B:
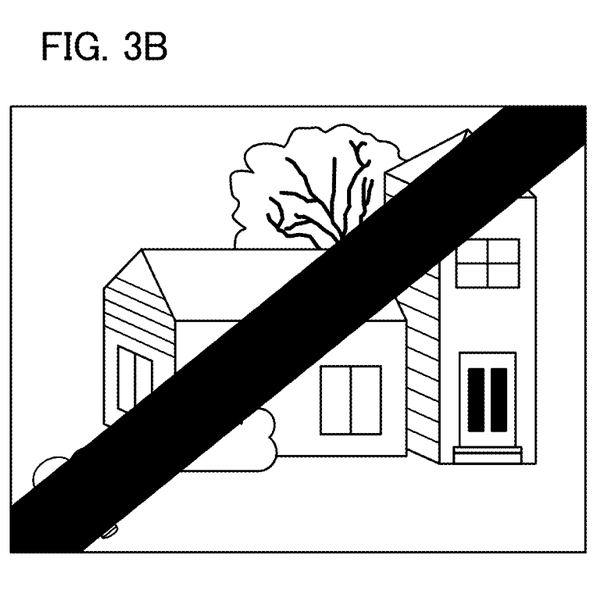

In the case of WIDE (a wide angle) in which a zoom magnification of the photographing lens 5 is relatively small, when the wiper is outside of a screen, an image of the subject as illustrated in FIG. 3A is photographed using the imaging device 1. On the other hand, as illustrated in FIG. 1B, if the blade section 7b passes over the front surface of the photographing lens 5, as illustrated in FIG. 3B, an image in which the blade section 7b is interrupting is provided.

Figure 4A:
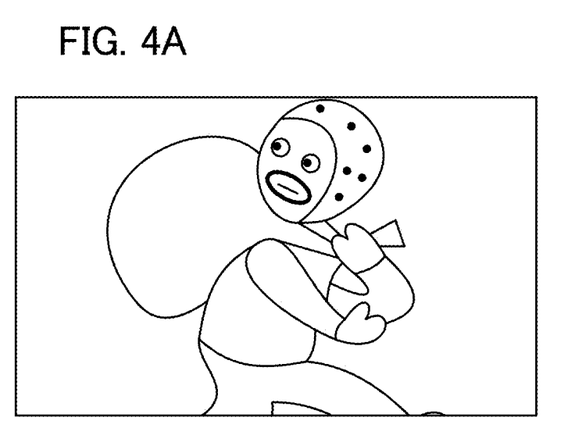
FIGS. 4A and 4B are diagrams for explaining an example of the influence of the wiper if the zoom magnification is large in the first embodiment of the present invention.
Figure 4B:
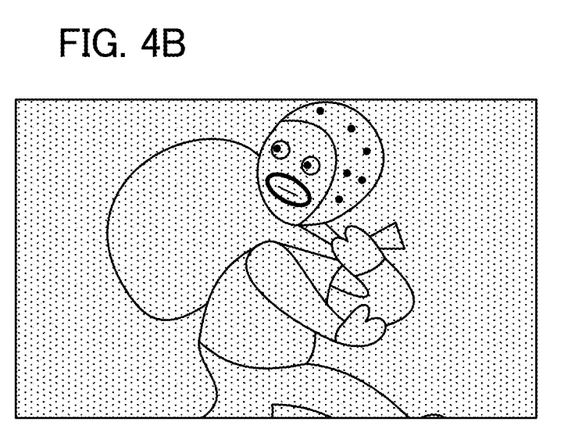

Also, in the case of TELE (telephoto) in which the zoom magnification of the photographing lens 5 is relatively large, when the wiper is outside of the screen, an image of the subject as illustrated in FIG. 4A is photographed using the imaging device 1. On the other hand, if the blade section 7b passes over the front surface of the photographing lens 5, as illustrated in FIG. 4B, an overall darkened image is provided.

As illustrated in FIG. 3A to FIG. 4B, the influence of the blade section 7b on an image differs in accordance with a zoom position (a zoom magnification) of the photographing lens. This is because a focal length changes depending on the zoom position (the zoom magnification) of the photographing lens and a light flux diameter differs in accordance with the focal length.

If the focal length is small in WIDE or the like in which the zoom magnification is small, the light flux diameter is small. Thus, the entire light flux diameter is covered with the blade section 7b, a shadow is partially generated, and the shadow is influencing a photographed image.

On the other hand, in TELE or the like in which the zoom magnification is large, if the focal length is large, the light flux diameter is large. Thus, only a part of the light flux diameter is covered with the blade section 7b and an overall darkened photographed image is provided.

Therefore, an extent that the passing of the blade section 7b adversely affects the photographed image changes depending on a magnitude of the zoom magnification (the focal length).

Also, since the blade section 7b wipes a surface of the cover plate 6 by bringing the blade section 7b into contact with the surface of the cover plate 6 and operating the blade section 7b on the surface of the cover plate 6, a sliding section gradually deteriorates each time the blade section 7b operates.

FIGS. 5A to 5F illustrate an example of photographed images in a state in which water drops are adhered to the surface of the cover plate 6.

Figure 5A:
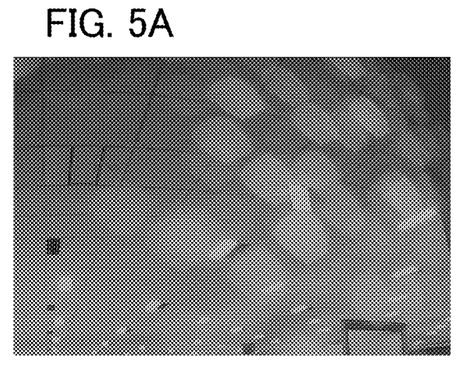
FIGS. 5A to 5F are diagrams for explaining an influence of raindrops if a focal length and an aperture value are changed in the first embodiment of the present invention.
Figure 5B:
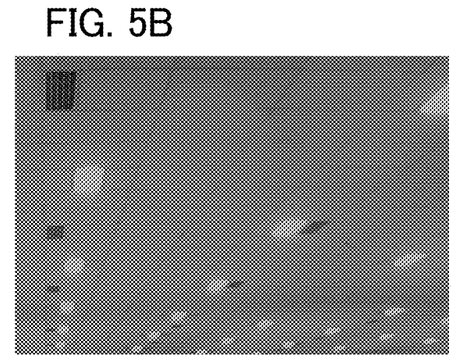
Figure 5C:
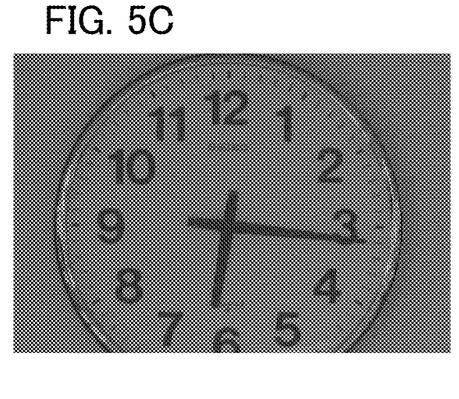
Figure 5D:
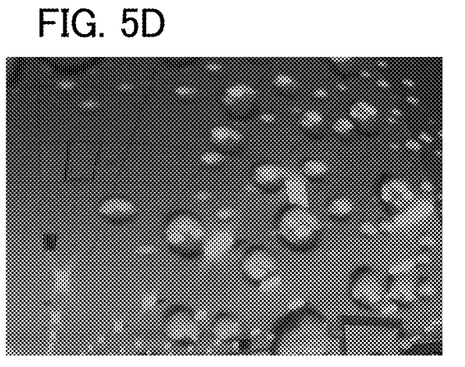
Figure 5E:
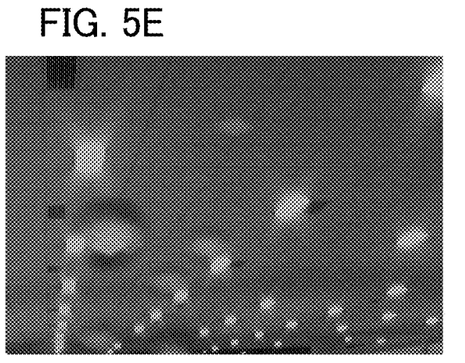
Figure 5F:
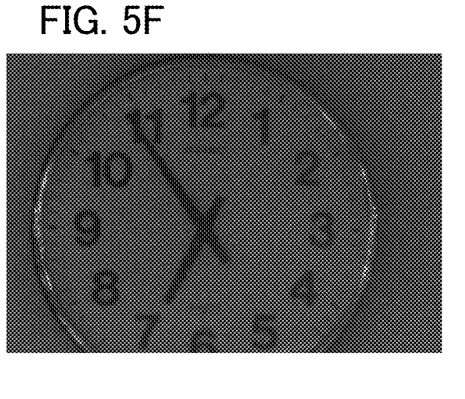

FIGS. 5A, 5B, and 5C are photographed images if focal lengths are 2 mm, 6 mm, and 132 mm and photographing is performed in a diaphragm opened state. FIGS. 5D, 5E, and 5F are photographed images in a case in which photographing is performed in a state in which each aperture value is set to F8 if the focal lengths are 2 mm, 6 mm, and 132 mm.

As illustrated in FIG. 5A, if the focal length is small, water drops are clearly imaged, but as illustrated in FIG. 5B, if the focal length is large, the water drops are blurred. In addition, as illustrated in FIG. 5C, if a mode is telephoto, there is almost no influence of the water drops and there is no influence on subject photography.

This is a phenomenon occurring since a light flux diameter differs in accordance with the focal length of the lens as described above.

Also, as can be seen through comparison of FIG. 5A and FIG. 5D and FIG. 5B and FIG. 5E, even with the same focal length, if the aperture value is large (that is, a diaphragm diameter is small), the water drops are more clearly imaged and the influence on subject photography increases.

This is a phenomenon occurring since a depth of field increases if the aperture value increases.

Therefore, the influence of the water drops adhering to the surface of the cover plate in front of the lens on the photographed image changes in accordance with the focal length and the aperture value of the lens. In addition, when the focal length decreases and when the aperture value increases, the water drops are clearly imaged and the influence on subject photography increases.

Figure 6:
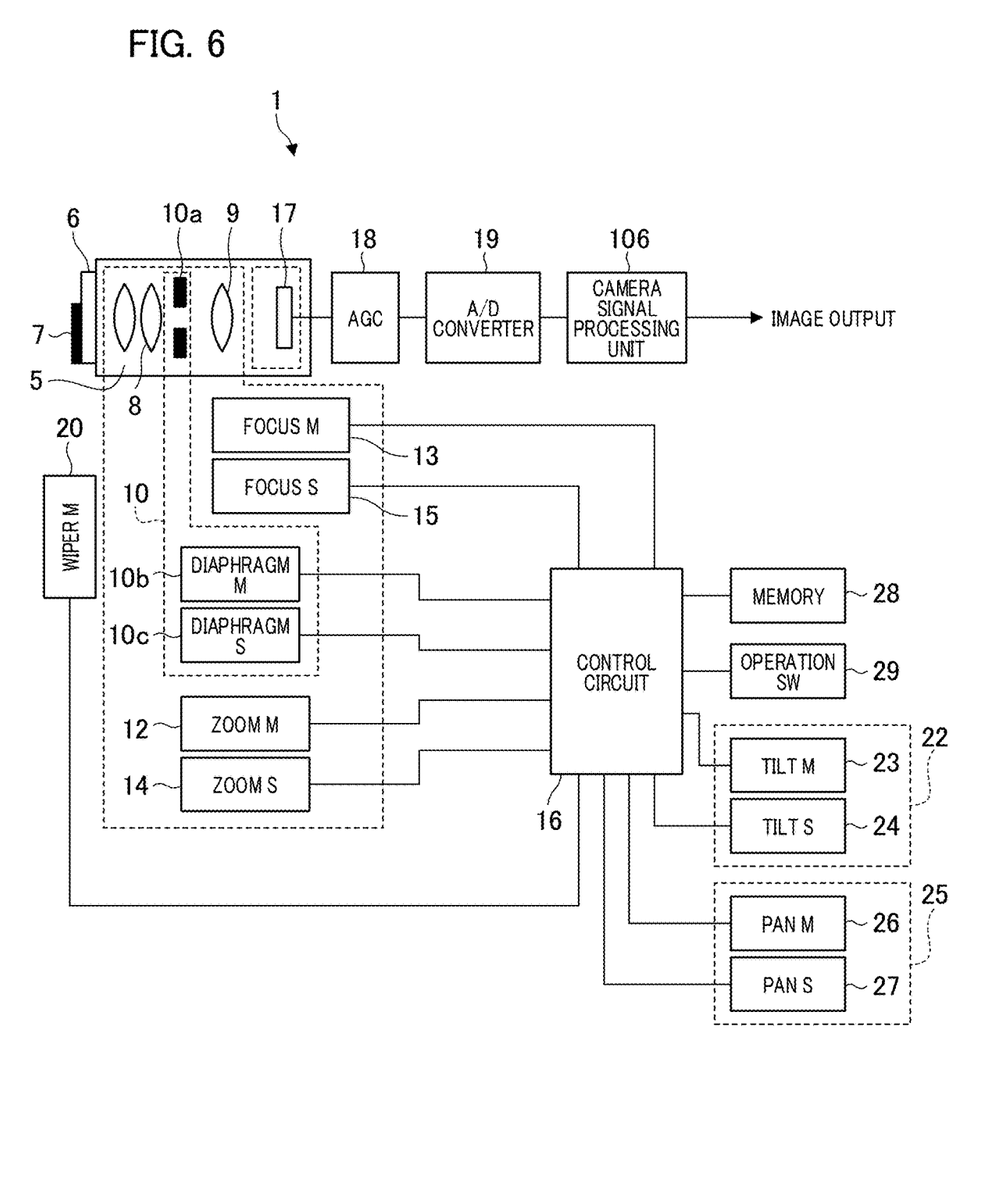
FIG. 6 is a circuit block diagram of the imaging device in the first embodiment of the present invention.

FIG. 6 is a circuit block diagram of the imaging device in the first embodiment of the present invention.

In the imaging device 1 in the first embodiment, the zoom lens group 8 is driven by a zoom motor 12 and the focus lens group 9 is driven by a focus motor 13 in the optical axis direction. A position of the zoom lens group 8 is detected by a zoom sensor 14, a position of the focus lens group 9 is detected by a focus sensor 15, and zoom focus control is performed using a control circuit 16 on the basis of information regarding the detected positions.

The diaphragm unit 10 includes the diaphragm blades 10a, the diaphragm motor 10b, and a diaphragm sensor 10c.

Furthermore, an aperture value can be changed by rotating the diaphragm blades 10a through the driving of the diaphragm motor 10b on the basis of information regarding positions of the diaphragm blades 10a detected by the diaphragm sensor 10c to change an opening area of a diaphragm.

A subject image captured through the photographing lens 5 is converted into an electrical signal using the imaging device 17. An electrical signal (an image signal) output from the imaging device 17 is gain-adjusted using a variable amplifier circuit (AGC) 18, analog/digital (A/D)-converted by an A/D converter 19, signal-processed by a camera signal processing unit 106, and then output as a video signal.

The wiper 7 is driven by a wiper motor 20 and wipes an outer surface of the cover plate 6 located on the front surface of the photographing lens 5. The driving of the wiper motor 20 is controlled by the control circuit 16. A CPU as a computer is built into the control circuit 16 and functions as a control unit configured to execute various operations of the entire device on the basis of a computer program stored in a memory 28 which will be described later.

A tilt unit 22 is constituted of a tilt motor 23 and a tilt reset sensor 24. The tilt motor 23 drives the photographing lens 5 in a tilt direction and the tilt reset sensor 24 detects a tilt initial position. Driving conditions such as an amount of driving and a driving speed of the tilt motor 23 are controlled by the control circuit 16.

A pan unit 25 is constituted of a pan motor 26 and a pan reset sensor 27. The pan motor 26 drives the tilt unit 22 configured to hold the photographing lens 5 in a pan direction and the pan reset sensor 27 detects a pan initial position. Driving conditions such as an amount of driving and a driving speed of the pan motor 26 are controlled by the control circuit 16.

The memory 28 stores preset setting values, the above-described computer program, and the like and an operation switch 29 is a switch with which a user operates the imaging device 1.

Zoom, focus, diaphragm, pan, and tilt operations are performed through the operation of the operation switch 29 by the user. Furthermore, there is a so-called preset patrol function of associating a combination of these conditions with a time axis and storing the association.

With the preset patrol function, a plurality of photographing locations can be set as patrol locations and a combination of a photographing order, a staying time (a photographing time), a zoom magnification, and the like of the plurality of photographing locations can be set as a patrol setting. Thus, it is possible to perform photographing automatically while sequentially patrolling around a plurality of photographing locations. The user can periodically acquire videos of a plurality of desired places using one imaging device by repeatedly performing preset patrolling using the patrol setting at predetermined time intervals.

Figure 7:
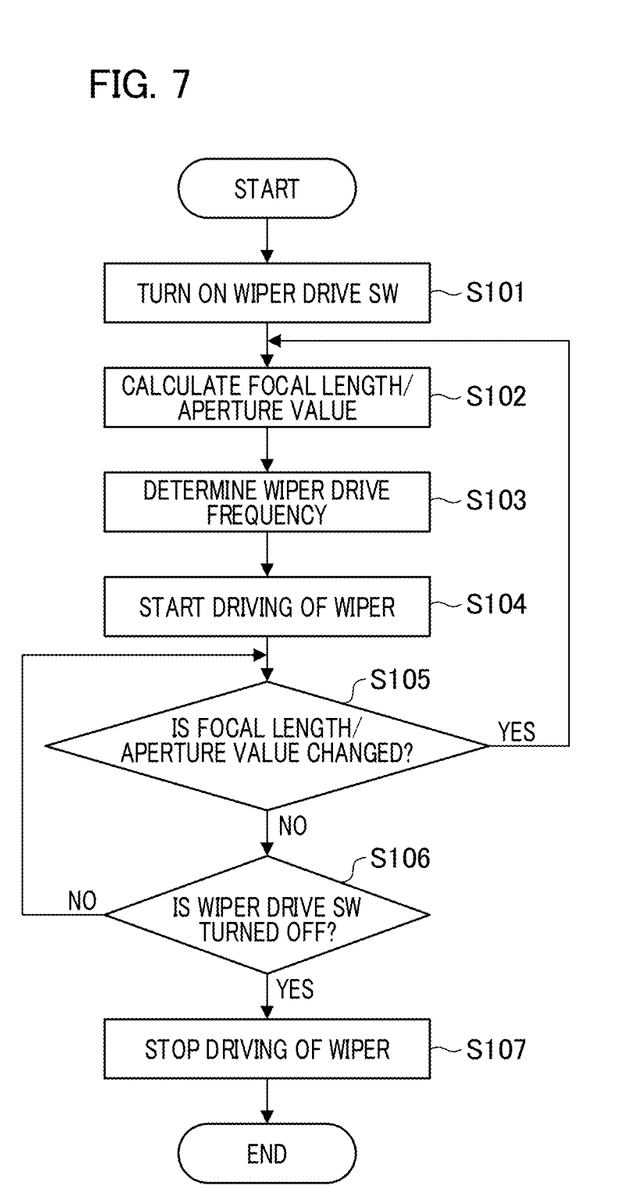
FIG. 7 is a flowchart for describing an operation in the first embodiment of the present invention.

FIG. 7 is a flowchart for describing an operation in the first embodiment of the present invention. The control in the first embodiment of the present invention will be described with reference to FIG. 7.

In S101, if a wiper driving switch is turned on by an operation or the like of the operation switch 29 by the user, the process proceeds to S102. In S102, a focal length and an aperture value of the photographing lens 5 are calculated and the process proceeds to S103. The control circuit 16 calculates the focal length from detected values of the positions of the zoom lens group 8 and the focus lens group 9 and the aperture value from detected values of the positions of the diaphragm blades 10a. At this time, the control circuit 16 functions as a detection unit.

In S103, the control circuit 16 compares the focal length and the aperture value calculated in S102 with a predetermined wiper drive frequency setting table stored in the memory 28 to determine the wiper drive frequency for the wiper driving conditions.

That is to say, determining any region of the setting table to which the focal length and the aperture value calculated in S102 belong is performed by comparing the focal length and the aperture value calculated in S102 with a plurality of focal lengths and a plurality of aperture values in the setting table. For example, if the aperture value is smaller than 4, a determination concerning whether the focal length is 10 mm or more is performed. In addition, if it is determined that the focal length is 10 mm or more, the driving of the wiper is stopped. On the other hand, for example, if it is determined that the aperture value is 11 or more, the driving of the wiper is not stopped unless it is determined that the focal length is 100 mm or more.

Figure 8:
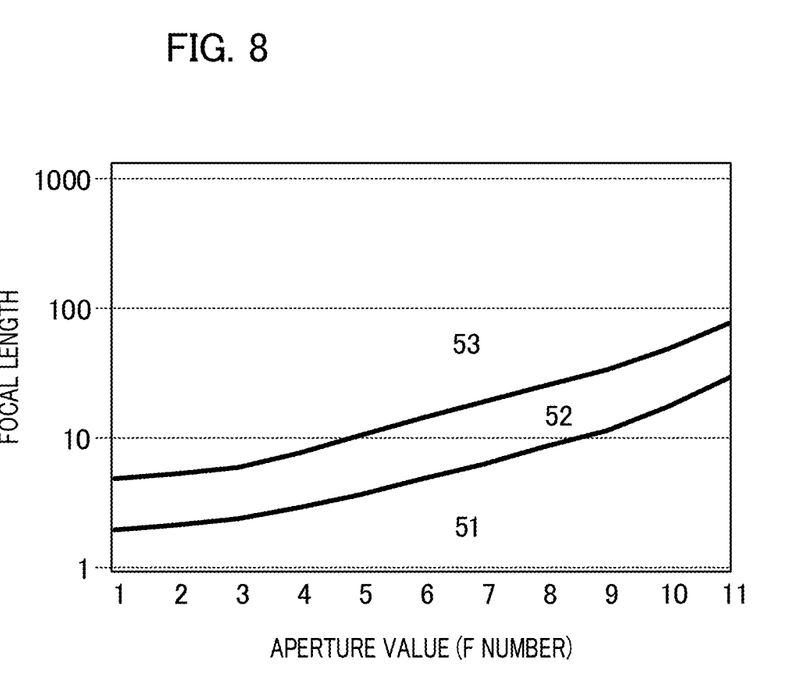
FIG. 8 is a diagram illustrating an example of a wiper drive frequency setting table for a focal length and an aperture value in the first embodiment of the present invention.

FIG. 8 is a diagram illustrating an example of a wiper drive frequency setting table for a focal length and a aperture value.

In FIG. 8, a horizontal axis represents an aperture value and a vertical axis represents a focal length (mm). In addition, the table has a region 51, a region 52, and a region 53 which are divided. Each of the regions indicates a wiper drive frequency, the region 51 is set to the driving of the wiper at one-minute intervals, the region 52 is set to the driving of the wiper at 30-minute intervals, and the region 53 is set not to perform the driving of the wiper. In this way, the wiper drive frequency includes a frequency in a case in which the driving of the wiper is stopped (in a case in which the wiper drive frequency is zero).

The wiper drive frequency setting table in FIG. 8 is set on the basis of the fact that a degree of influence of water drops adhering to the cover plate differs in accordance with the focal length and the aperture value as illustrated in FIGS. 5A to 5F. That is to say, for example, a driving frequency is set to increase when the influence of the water drops are large and the visibility of an image of the subject is poor.

In S104, the driving of the wiper is started in accordance with the setting of the wiper drive frequency determined in S103.

If a change in at least one of the focal length and the aperture value is detected in S105, the process returns to S102. In addition, if the change is not detected, the process proceeds to S106.

Examples of a case in which the focal length and the aperture value are changed include a case in which the focal length and the aperture value are changed through the user's operation, a case in which the focal length and the aperture value are preset due to preset patrolling or the like and preset photographing locations or the like are changed, and the like.

Also, further examples of a case in which the aperture value is changed include a case in which the aperture value is automatically changed in a case in which the brightness of the subject is changed if a so-called auto exposure (AE) is set and the like.

The auto AE is a function of automatically adjusting an aperture value, a shutter speed, a gain, and the like in accordance with the luminance of an image captured by the imaging device and obtaining the image with an optimum exposure.

In S105, if it is detected in S106 that a wiper drive OFF switch has been operated through the user's operation or the like, the process proceeds to S107, the driving of the wiper is stopped in S107, and the process ends.

With the above-described configuration, the wiper drive frequency is determined as the wiper driving conditions and the process is performed on the basis of the conditions of the table in which a degree of influence of water drops adhering to the optical surface of the front surface of the photographing lens on the image is preset. For this reason, since the unnecessary driving of the wiper can be prevented, it is possible to reduce a frequency of an influence of the wiper on the image when the wiper passes through the front surface of the photographing lens and to minimize the deterioration of the wiper mechanism due to the driving.

Second Embodiment

Figure 9:
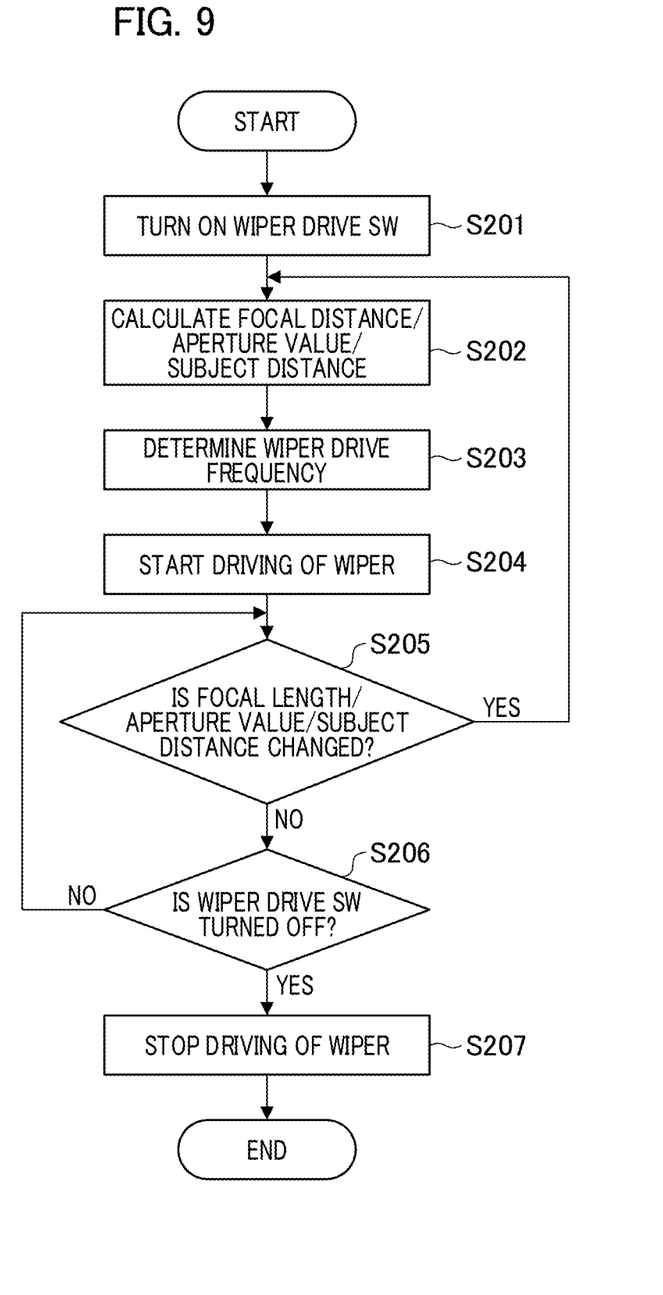
FIG. 9 is a flowchart for describing a second embodiment of the present invention.
Figure 10A:
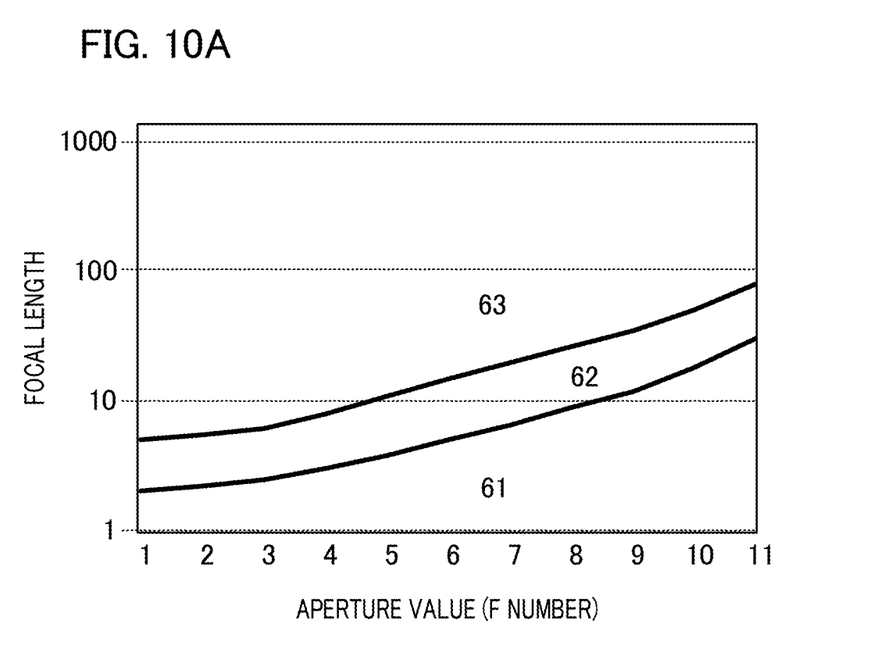
FIGS. 10A and 10B are setting diagrams illustrating the second embodiment of the present invention.
Figure 10B:
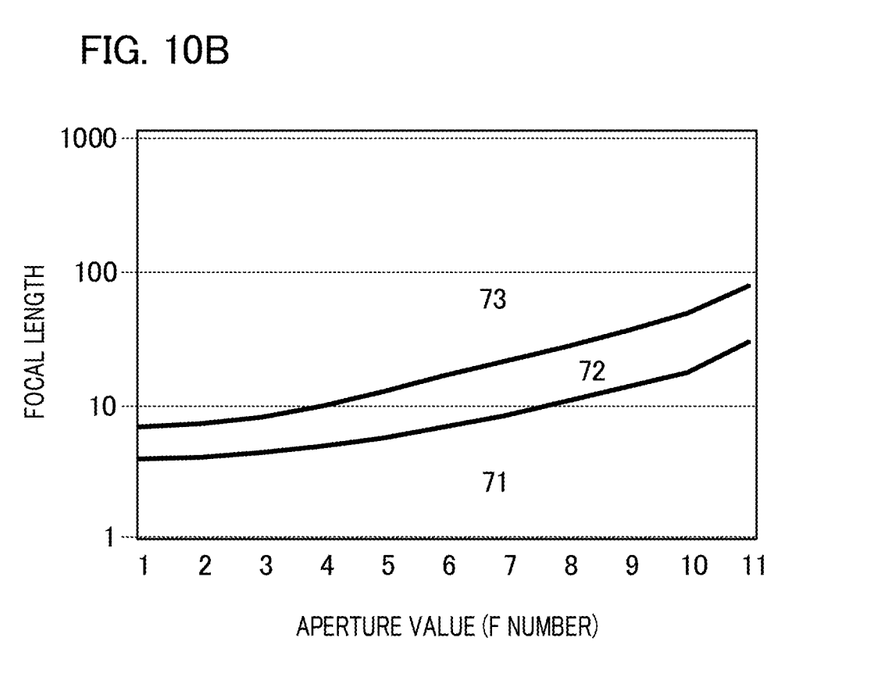

A second embodiment of the present invention will be described below. The second embodiment and the first embodiment differ in that a subject size (a subject distance) is also taken into consideration. FIG. 9 is a flowchart for describing an operation in the second embodiment of the present invention. FIGS. 10A and 10B are diagrams illustrating another example of the wiper drive frequency setting table according to the focal length, the aperture value, and the subject distance.

FIG. 10A is a setting table in a case in which the subject distance is a long distance equal to or larger than a predetermined value, FIG. 10B is a wiper drive frequency setting table in a case in which the subject distance is a short distance smaller than a predetermined value, and horizontal axes represent an aperture value and vertical axes represent a focal length (mm).

In FIG. 9, if the user operates the operation switch 29 to turn on the wiper driving switch in S201, a focal length, an aperture value, and a subject distance of the photographing lens 5 are calculated in S202 and the process proceeds to S203. The control circuit 16 calculates the focal length and the subject distance from detected values of the positions of the zoom lens group 8 and the focus lens group 9 and the aperture value from detected values of the positions of the diaphragm blades 10a. At this time, the control circuit 16 functions as a detection unit.

In S203, the control circuit 16 determines a wiper drive frequency by collating the value detected in S202 with a correlation table of a wiper drive frequency stored in the memory 28.

That is to say, the subject distance calculated in S202 is compared with a predetermined subject distance and any table of the tables of FIGS. 10A and 10B corresponding to the result of the comparison is determined and selected. Subsequently, the focal length and the aperture value calculated in S202 are compared with a plurality of focal lengths and a plurality of aperture values in the selected setting table of FIGS. 10A and 10B. Accordingly, any region in the setting table to which the focal length and the aperture value calculated in S102 belong is determined.

The table in FIG. 10A has a region 61, a region 62, and a region 63 which are divided. Each of the regions indicates a wiper drive frequency, the region 61 is set to the driving of the wiper at one-minute intervals, the region 62 is set to the driving of the wiper at 30-minute intervals, and the region 63 is set not to perform the driving of the wiper.

The table in FIG. 10B has a region 71, a region 72 and a region 73 which are divided. Each of the regions indicates a wiper drive frequency, the region 71 is set to the driving of the wiper at one-minute intervals, the region 72 is set to the driving of the wiper at 30-minute intervals, and the region 73 is set not to perform the driving of the wiper.

In S204, the driving of the wiper is started in accordance with the setting of the wiper drive frequency determined in S203.

If a change in at least one of the focal length, the subject distance, and the aperture value is detected in S205, the process returns to S202. In addition, if the change is not detected, the process proceeds to S206.

If it is detected in S206 that the wiper drive OFF switch has been pressed through the user's operation, the process proceeds to S207. In addition, the driving of the wiper is stopped in S207 and the process ends.

In the second embodiment, as illustrated in the tables in FIGS. 10A and 10B, the setting of the wiper drive frequency is changed depending on whether a subject distance is a long distance or a close distance. If the subject at the short distance is photographed, a size of the subject is greatly displayed on a photographing screen in many cases. Thus, water drops adhering to the cover plate are less likely to cover the entire subject image.

On the other hand, if the subject at the long distance is photographed, the size of the subject image displayed on the photographing screen is small in many cases and water drops adhering to the cover plate cover the entire subject in many cases.

In the second embodiment, as illustrated in the tables in FIGS. 10A and 10B, in addition to the conditions such as the focal length and the aperture value, control is performed so that the wiper drive frequency is reduced when the subject image is relatively large at a short distance.

Although the subject distance is used to determine the subject size in the above embodiments, a size of a main subject may be directly detected using image recognition instead of the subject distance. As a result, if the size of the subject is smaller than a predetermined value, the driving frequency as the driving condition of the wiper is increased, and if the size of the subject is larger than the predetermined value, the driving frequency as the driving condition of the wiper may be reduced or the driving of the wiper may be stopped. It is more accurate to determine the size of the subject through direct image recognition as described above than to determine the size of the subject on the basis of the subject distance.

Although the present invention has been described in detail above on the basis of the preferred embodiments, the present invention is not limited to the above embodiments, various modifications can be provided on the basis of the gist of the present invention, and these modifications are not excluded from the scope of the present invention.

For example, in the second embodiment, the driving condition of the wiper is determined with reference to the table corresponding to the combination of the three parameters of the focal length, the subject size, and the aperture value. However, the driving condition of the wiper may be determined using the table through a table or a functional expression in which at least one of the above three parameters is associated with the driving condition of the wiper.

For example, the driving condition of the wiper may be determined by comparing only one of the three parameters, for example, only the subject size, with a predetermined value. Alternatively, for example, the driving condition of the wiper may be determined by comparing only the subject size and the focal length with predetermined values in the table. Furthermore, for example, the driving condition of the wiper may be determined by comparing only the subject size and the aperture value with predetermined values in the table.

Also, although the driving conditions such as the driving frequency of the wiper are determined using the table in the first and second embodiments, the driving conditions such as the driving frequency of the wiper may be determined through the calculation on the basis of the functional expression prepared in advance to correspond to the table instead of the table.

Also, although a description has been provided using the driving frequency as an example as the driving condition of the wiper in the above embodiments, the driving condition is not limited to the driving frequency, and for example, a driving speed may be used. The driving speed is set to be slower when the focal length is increased, the aperture value is reduced, or the subject size is increased.

Furthermore, a part or all of the control in the embodiments may be performed so that a computer program configured to realize the functions of the above embodiments is supplied to the imaging device through a network or various storage media. Moreover, a computer (or a CPU, an MPU, or the like) in the imaging device may read an execute the program. In this case, the program and a storage medium storing the program form the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-155496 filed on Aug. 28, 2019, which is hereby incorporated by reference herein in its entirety.

What is claimed is:

1. An imaging device, comprising:
   a lens;
   an optical member provided on a front surface side of the lens;
   a wiper configured to wipe a surface of the optical member; and
   at least one processor or circuit which functions as
      a detection unit configured to detect a focal length of the lens; and
      a control unit configured to drive the wiper so that a driving frequency of the wiper is reduced as the focal length becomes longer so that influence of materials adhering to the optical member is reduced in a captured image.

2. The imaging device according to claim 1, wherein reducing the driving frequency of the wiper by the control unit includes stopping driving of the wiper.

3. The imaging device according to claim 1, wherein the control unit reduces a frequency of driving of the wiper if the focal length is longer than a predetermined value.

4. The imaging device according to claim 1, wherein the detection unit is configured to detect an aperture value, and wherein the control unit reduces a frequency of driving of the wiper if the aperture value is smaller than a predetermined value.

5. The imaging device according to claim 1, wherein the detection unit is configured to detect a subject size, and wherein the control unit reduces a frequency of driving of the wiper if the subject size is larger than a predetermined value.

6. The imaging device according to claim 1, wherein the control unit determines the driving frequency of the wiper in accordance with a combination of the focal length, an aperture value, and a subject size.

7. The imaging device according to claim 1, wherein the detection unit detects a subject size on the basis of a subject distance.

8. A method of controlling an imaging device which includes:
   a lens;
   an optical member provided on a front surface side of the lens; and
   a wiper configured to wipe a surface of the optical member by:
      detecting a focal length of the lens; and
      driving the wiper so that a driving frequency of the wiper is reduced as the focal length becomes longer so that influence of materials adhering to the optical member is reduced in a captured image.

9. A non-transitory computer-readable storage medium which stores a computer program configured to control an imaging device which includes:
   a lens;
   an optical member provided on a front surface side of the lens; and
   a wiper configured to wipe a surface of the optical member,
   wherein the computer program comprises instructions for executing the following processes:
      detecting a focal length of the lens; and
      driving the wiper so that a driving frequency of the wiper is reduced as the focal length becomes longer so that influence of materials adhering to the optical member is reduced in a captured image.

10. An imaging device, comprising:
   a lens;
   an optical member provided on a front surface side of the lens;
   a wiper configured to wipe a surface of the optical member; and
   at least one processor or circuit which functions as
      a detection unit configured to detect a focal length of the lens; and
      a control unit configured to drive the wiper so that a driving speed of the wiper is reduced as the focal length becomes longer so that influence of materials adhering to the optical member is reduced in a captured image.

* * * * *